United States Patent
Moyal et al.

(10) Patent No.: US 11,676,114 B2
(45) Date of Patent: *Jun. 13, 2023

(54) AUTOMATED CONTROL OF DISTRIBUTED COMPUTING DEVICES

(71) Applicant: Atera Networks Ltd., Tel Aviv (IL)

(72) Inventors: Oshri Moyal, Yavne (IL); Gil Pekelman, Tel Aviv (IL); Eliezer Dikstein, Rehovot (IL)

(73) Assignee: Atera Networks Ltd, Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,170

(22) Filed: Oct. 8, 2021

(65) Prior Publication Data

US 2022/0101274 A1 Mar. 31, 2022

Related U.S. Application Data

(63) Continuation of application No. 17/254,843, filed as application No. PCT/US2019/040408 on Jul. 2, 2019, now Pat. No. 11,144,890.

(Continued)

(51) Int. Cl.
*G06F 11/30* (2006.01)
*G06Q 10/20* (2023.01)
(Continued)

(52) U.S. Cl.
CPC .......... *G06Q 10/20* (2013.01); *G06F 16/211* (2019.01); *G06N 5/02* (2013.01)

(58) Field of Classification Search
CPC .................................................... G06Q 10/20
See application file for complete search history.

(56) References Cited

U.S. PATENT DOCUMENTS

2005/0278789 A1  12/2005  Wright et al.
2008/0172574 A1*  7/2008  Fisher ...................... G06N 5/02
                                                      714/25

(Continued)

OTHER PUBLICATIONS

International Search Report and Written Opinion of the International Searching Authority issued in PCT/US2019/040408, dated Oct. 17, 2019; ISA/US.

(Continued)

*Primary Examiner* — Phuong Huynh
(74) *Attorney, Agent, or Firm* — Miller Johnson

(57) ABSTRACT

A method includes receiving a service ticket corresponding to an undesired state of a client device, assigning the service ticket to a technician, and coordinating a remote control session between a technician device and the client device. The method includes obtaining a set of actions performed under remote technician control to transition the client device from the undesired state to a desired state. Each action describes one or more user interface interactions with the client device. The method includes storing a resolution profile (RP) based on the set of actions and textual descriptors. The method includes classifying a second service ticket received from a second client device. The method includes, in response to the classification indicating that the RP is applicable to the second service ticket, selectively instructing a software agent executing on the second client device to programmatically replay the set of actions from the RP without technician intervention.

20 Claims, 10 Drawing Sheets

Related U.S. Application Data

(60) Provisional application No. 62/693,410, filed on Jul. 2, 2018.

(51) Int. Cl.
 *G06F 16/21* (2019.01)
 *G06N 5/02* (2023.01)

(56) References Cited

U.S. PATENT DOCUMENTS

2012/0203880 A1* 8/2012 Kluyt .................... G06F 9/54
 709/223
2015/0379520 A1 12/2015 Allen et al.

OTHER PUBLICATIONS

International Preliminary Report on Patentability (Chapter II of the Patent Cooperation Treaty) issued in PCT/US2019/040408 (with 15 page annex); dated Jul. 24, 2020; IPEA/US.
European Patent Office, Extended European Search Report for EP App. No. 19831206.8, dated Feb. 24, 2022.

* cited by examiner

AUTOMATED CONTROL OF DISTRIBUTED COMPUTING DEVICES

CROSS-REFERENCE TO RELATED APPLICATIONS

This application is a Continuation of U.S. application Ser. No. 17/254,843 filed Dec. 21, 2020 (now U.S. Pat. No. 11,144,890 issued Oct. 12, 2021), which is a National Stage of International Application No. PCT/US2019/040408 filed Jul. 2, 2019, which is a PCT International Application of U.S. Provisional Application No. 62/693,410 filed Jul. 2, 2018. The entire disclosures of the applications referenced above are incorporated by reference.

FIELD

The present disclosure relates to distributed computing devices and more particularly to apparatuses and methods for remote control of distributed computing devices.

BACKGROUND

In an environment filed with computers, a user of a computer may encounter various incidents with the user's computer. For example, the user may be unable to save a file to a network hard drive, unable to print a document, unable to launch a particular application, etc. The user may contact an information technology (IT) technician, who may have the knowledge and resources to resolve the incident. However, the technician may be unavailable to provide immediate assistance to the user, such as when the technician is assisting other users, the incident arises outside of normal business hours, etc.

Once the technician becomes available to provide assistance, the technician has to request and be granted permission from the user before the technician can remotely connect to the user's computer. The technician may perform a set of actions in order to resolve the user's incident. In response to resolving the incident, the technician may discuss the solution with other technicians so that other technicians may implement a similar solution if the other technicians encounter the incident.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and a non-transitory computer-readable medium configured to store instructions for execution by the at least one processor. The instructions include receiving a service ticket corresponding to an undesired system state of a client device. The instructions include assigning the service ticket to a technician. The instructions include coordinating a remote control session between a technician device and the client device, where the technician device is under control of the technician. The instructions include obtaining a set of actions performed under remote control by the technician to transition the client device from the undesired system state to a desired system state, where each action of the set of actions describes one or more user interface (UI) interactions with the client device. The instructions include identifying a set of keywords based on characteristics of the service ticket. The instructions include associating the identified keywords with the set of actions. The instructions include presenting the set of actions and the identified keywords to the technician. The instructions include selectively modifying the set of actions in response to receiving input from the technician. The instructions include storing a resolution profile (RP) in response to technician approval, where the RP is based on the modified set of actions and the identified keywords. The instructions include selectively replaying the set of actions from the RP on a second client device in response to receiving a second service ticket submitted on behalf of the second client device.

In other features, each action of the set of actions is stored in a basic resolution step (BRS) data structure that conforms to a BRS data structure definition, and the RP encodes an order of execution of the BRS data structures. In other features, a first BRS data structure corresponding to a first action of the set of actions includes a screenshot of the client device captured before the first action is performed. In other features, the first BRS data structure stores a command where execution transitions the client device from the undesired system state to a second system state.

In other features, a first action of the set of actions includes at least one of a mouse event and a keypress event on a keyboard. In other features, the instructions include, in response to the second client device being in the undesired system state, replaying the RP at the second client device. In other features, the RP is stored as a collection of files that correspond one-to-one to the set of actions. In other features, the obtaining the set of actions includes receiving the set of actions from one of the client device or the technician device upon completion of the remote control session.

In other features, the obtaining the set of actions includes recording the set of actions as sent to the client device by the technician device. In other features, the assigning the service ticket to the technician is performed in response to a request for the ticket by the technician. In other features, the instructions include modifying the set of keywords in response to a modification request from the technician.

In other features, the set of keywords includes at least one of an operating system type and a name of an application. In other features, the instructions include generating the service ticket from at least one of a web browser, an email interface, a chat interface, and a phone call. In other features, the instructions include, after the storing, selectively converting the RP to a knowledge base (KB) article to share with other technicians, where the KB article includes a serialized RP.

A method includes receiving a service ticket corresponding to an undesired system state of a client device. The method includes assigning the service ticket to a technician. The method includes coordinating a remote control session between a technician device and the client device. The technician device is under control of the technician. The method includes obtaining a set of actions performed under remote control by the technician to transition the client device from the undesired system state to a desired system state. Each action of the set of actions describes one or more user interface (UI) interactions with the client device. The method includes identifying a set of keywords based on characteristics of the service ticket. The method includes associating the identified keywords with the set of actions. The method includes presenting the set of actions and the identified keywords to the technician. The method includes selectively modifying the set of actions in response to receiving input from the technician. The method includes storing a resolution profile (RP) in response to technician approval. The RP is based on the modified set of actions and the identified keywords. The method includes selectively replaying the set of actions from the RP on a second client device in response to receiving a second service ticket submitted on behalf of the second client device.

In other features, each action of the set of actions is stored in a basic resolution step (BRS) data structure that conforms to a BRS data structure definition. The RP encodes an order of execution of the BRS data structures. In other features, a first basic resolution step (BRS) data structure corresponding to a first action of the set of actions includes a screenshot of the client device captured before the first action is performed. The first BRS data structure stores a command where execution transitions the client device from the undesired system state to a second system state. In other features, the method includes, in response to the second client device being in the undesired system state, replaying the RP at the second client device. In other features, the RP is stored as a collection of files that correspond one-to-one to the set of actions.

In other features, the obtaining the set of actions includes at least one of receiving the set of actions from one of the client device or the technician device upon completion of the remote control session and recording the set of actions as sent to the client device by the technician device. In other features, the assigning the service ticket to the technician is performed in response to a request for the ticket by the technician. The method includes modifying the set of keywords in response to a modification request from the technician. In other features, a first action of the set of actions includes at least one of a mouse event and a keypress event on a keyboard. The set of keywords includes at least one of an operating system type and a name of an application. In other features, the method includes generating the service ticket from at least one of a web browser, an email interface, a chat interface, and a phone call. In other features, the method includes, after the storing, selectively converting the RP to a knowledge base (KB) article to share with other technicians. The KB article includes a serialized RP.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
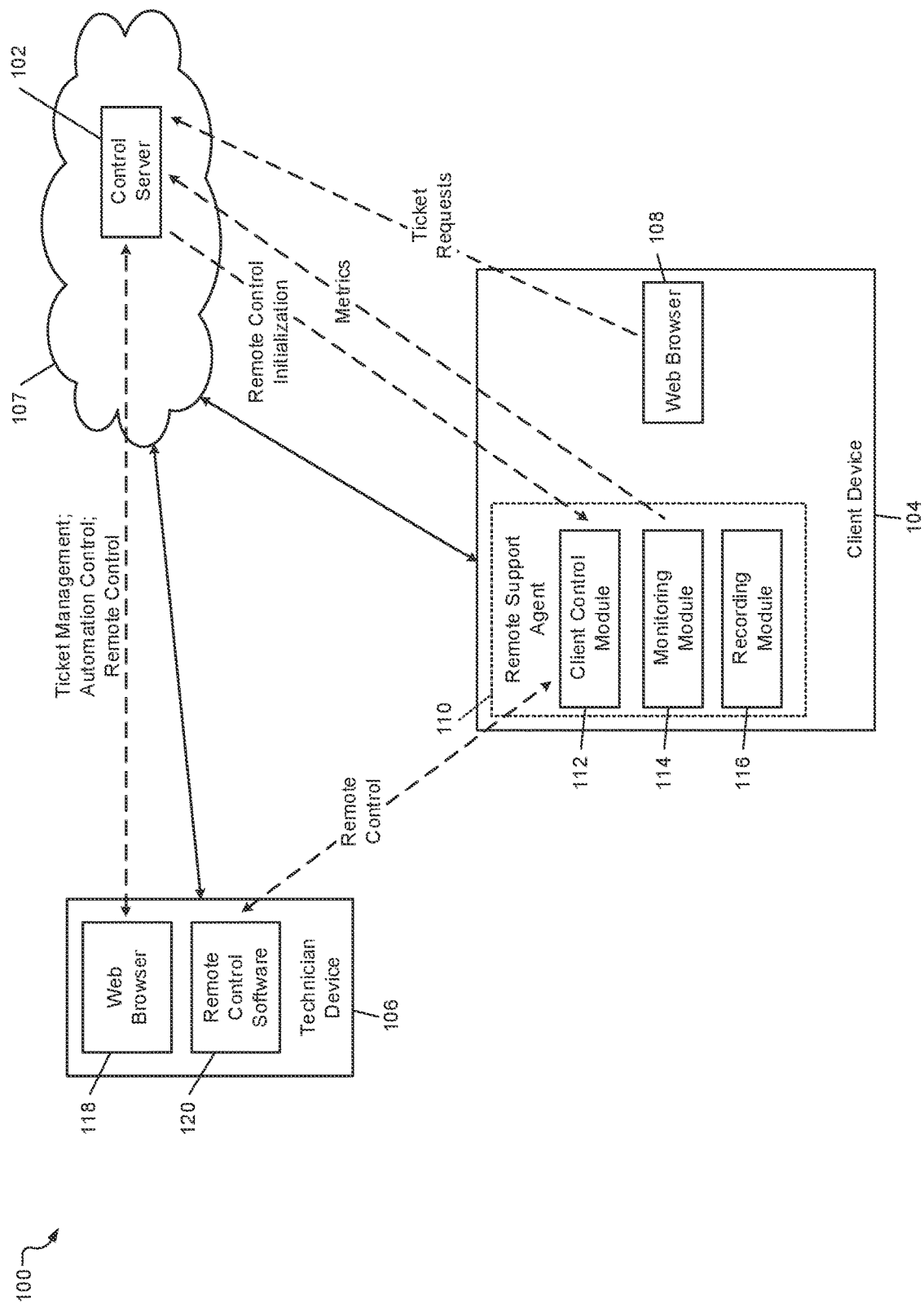
FIG. 1 is a block diagram of an example distributed computing system.

According to the present disclosure, a distributed computing system can record a set of actions and accompanying screenshot of a client device during a remote control session. The recording may be stored in the client device during the remote control session. The remote control session allows a technician to remotely perform the set of actions on the client device in order to resolve a service ticket. Each action of the set of actions describes one or more user interface (UI) interactions with the client device, such as a mouse event and/or a keyboard event. The service ticket may correspond to an undesired system state of the client device. The service ticket may include an incident, a request, a request not specific to the system state of the client device (e.g., creating a mail system distribution list, resetting login credentials, etc.), etc. For example, the undesired system state may be an issue that a user of the client device is experiencing with the client device—also referred to as an incident. As another example, the undesired system state may be the absence of a certain application on the client device—also referred to as a request.

When the recording is complete, the recording is compressed and transmitted from the client device to a control server. In various implementations, the recording may be performed on the control server or on a technician device that is operated by the technician. A set of keywords may be identified based on characteristics of the service ticket. The set of keywords may be associated with the recording.

The recording and the set of keywords are presented to the technician. The technician may review and modify the recording and the set of keywords. The technician may remove some actions from the set of actions because those actions may be irrelevant or redundant. The technician may also add annotations (for example, arrows, highlighting, text, labels, etc.) to the screenshots. The technician may add a description (e.g., additional instructions—such as to scroll down on a window—comments, etc.) to an action. When the reviewing and editing is completed, the modified set of actions and the set of keywords may be saved as a solution story.

The solution story describes the set of actions performed by the technician during the remote control session. The solution story may be presented to other technicians to demonstrate to other technicians on how to resolve the service ticket. In various implementations, the solution story may be shown to the user to demonstrate the set of actions performed by the technician.

The solution story may also be used to quickly resolve a second service ticket submitted on behalf of a second client device operated by a second user. In various implementations, service tickets may be submitted automatically in response to an anomaly detected by an anomaly detection process that receives monitored data, such as performance metrics.

The second service ticket is classified using, for example, natural language processing (NLP) and/or machine learning. Once the second service ticket is classified, a shortest path is determined that corresponds to the most optimal approach of resolving the second service ticket. For example, the shortest path is determined according to one or more criteria, such as time to solution, number of changes, is-restart-needed, etc. If the set of actions from the solution story contribute to the shortest path, the set of actions from the solution story may be performed on the second client device to resolve the second service ticket.

Environment

FIG. 1 is a block diagram of an example distributed computing system 100. The distributed computing system 100 includes a control server 102, a client device 104, and a technician device 106. The control server 102, the client device 104, and the technician device 106 may communicate with each other via a network 107, such as a local area network (LAN), a wide area network (WAN) such as the Internet, and/or other type of network. The control server 102 is shown within the network 107 simply to illustrate that the control server 102 may be offered according to a software-as-a-service model, and may be hosted using cloud infrastructure. The control server 102, the client device 104, and the technician device 106 may connect to the network 107 using wireless and/or wired connections. The client device 104 and the technician device 106 may be located at different geographical locations than the control server 102. The client device 104 may be located at a different geographical location than the technician device 106.

Each of the client device 104 and the technician device 106 may be a tablet, a laptop computer, a personal computer (PC), etc. The client device 104 includes a web browser 108 and a remote support agent 110. For example, the remote support agent 110 may be provided by an operator that controls the control server 102.

A user of the client device 104 may log into a web portal and open a service ticket using the web browser 108. The service ticket may relate to an incident—that is, abnormal or unexpected operation (such as the inability to access an existing file)—or a request for greater or different functionality (such as the ability to access a new file store). The incident or request may be resolvable solely using the client device 104 (though perhaps requiring special administrator privileges), solely using another resource (such as configuring a mail server), or may require the client device 104 and one or more other resources. While the present application is applicable to all three scenarios, for simplicity of explanation the scenario in which the service ticket can be resolved solely by way of the client device 104 will be described below.

The current state of the system (of which the client device 104 is a part) may be described as undesired—for example, an incident has revealed abnormal operation or a request indicates some perceived deficiency. Therefore, the service ticket corresponds to an undesired system state that is different than a desired system state of the client device 104. As further illustration, the failure of an already-installed application to open could be described as an incident—meanwhile, a request may be made for a new application to be installed. that a user is unable to launch a particular application on a client device.

The user may be required to populate certain fields of the service ticket before the service ticket can be submitted, such as a title, a description of symptoms experienced, contact information (such as name, username, email address, and phone number), etc. Some fields of the service ticket, such as the contact information may be auto-populated, as may tracking fields such as ticket creation date, ticket ID, ticket number, etc. These types of fields may be referred to as auto-populated fields.

A technician operating the technician device 106 may be required to populate certain fields of the service ticket, such as technician contact information (such as name, email address, phone number, etc.), ticket priority, ticket source, etc. Once the user submits the service ticket, a notification may be transmitted to the technician device 106 that notifies the technician that a new service ticket is received. The technician may log into a ticket management system to view the service ticket using a web browser 118. The technician may request assignment of the service ticket. In response to the service ticket being assigned to the technician, the technician may remotely connect to the client device 104 in order to diagnose and resolve the service ticket.

The web browser 118 may send a remote control initialization request to a client control module 112 via the control server 102. The remote control initialization request prompts the user for consent to a remote control session. In some implementations, the user may provide consent beforehand—the user then does not need to be present for initiation of the remote session. Once consent is granted by the user, remote control software 120 establishes a remote control session with the client control module 112 via the network 107. The remote control session allows the technician to remotely control the client device 104. In various implementations, the client control module 112 may be Splashtop remote control software, TeamViewer remote control software, or other type of remote control software.

In response to establishing the remote control session, a recording module 116 records the remote control session. During the remote control session, the technician may perform a set of actions using an input device to resolve the service ticket. The input device, such as a keyboard, a touchpad, a mouse, a touchscreen, etc., may be connected to the technician device. Each action of the set of actions describes one or more user interface (UI) interactions with the client device 104. A UI interaction may correspond to a mouse event on the mouse and/or a key on the keyboard. For example, the mouse event may be a button down, a button up, a click (e.g., button down closely followed by button up), etc. A keypress may be described as a key down followed closely by a key up.

As mentioned above, each action of the set of actions describes one or more UI interactions. For example, a dialog box may include five checkboxes that are all unchecked. A technician may perform a mouse event (e.g., click) on a checkbox to mark the checkbox as checked. Checking all five checkboxes may require five mouse events—one mouse event for each checkbox. In this case, the five mouse events may collectively be referred to as one action. In other cases, the five mouse events may be recorded as five separate actions—each mouse event corresponding to one action.

The recording of the remote control session may include the set of actions and a screenshot of the client device 104 prior to each of the actions being performed. For example, if a technician opens a window and then scrolls down the window to a text box and enters text into the text box, two screenshots may be recorded. A first screenshot may include the opened window and a second screenshot may include the text box with the entered text. The screenshot of the client device 104 may be recorded before a first action is performed. For example, if a technician wants to close a dialog box, the technician may maneuver a mouse pointer over the X before performing a mouse event (e.g., click) on the X. The screenshot may include the mouse pointer over the X rather than the result of performing the mouse event on the X. In various implementations, the screenshot may be recorded following performance of a first action.

In response to termination of the remote control session, the recording is complete. The remote control session may be terminated when the technician disconnects from the client device 104. The recording may be compressed (for example, using the rar or zip formats) and transmitted to the control server 102. In various implementations, the recording may be partially transmitted to the control server 102 at various time intervals (such as every minute, every 3 minutes, every 10 minutes, etc.) during the remote control session. Although the recording module 116 is shown and described as being located in the client device 104, the recording module 116 and the recording may be located in the control server 102, in the technician device 106, or in another location.

A monitoring module 114 monitors metrics of the client device 104, which may include performance metrics, installed applications, user lists, etc. The metrics may include system resources of the client device 104, such as processor usage percentage, memory (e.g., volatile or nonvolatile memory, cache, etc.) usage percentage, bulk storage (e.g., flash memory, magnetic hard disk drive (HDD), etc.) usage percentage, network connectivity (e.g., wired, wireless, etc.). The monitoring module 114 may send the metrics to the control server 102 based on a predetermined schedule. For example, the predetermined schedule may be once a day, twice a day, once per week, etc. In various implementations, the metrics may be transmitted immediately to the control server 102 in response to an anomaly detected in the metrics. In various implementations, a notification notifying that an anomaly has been detected in the metrics may be sent to the technician. Information (such as operating system, installed RAM, patch levels, CPU utilization, etc.) from the monitoring module 114 may be added to a service ticket created for the client device 104.

Figure 2:
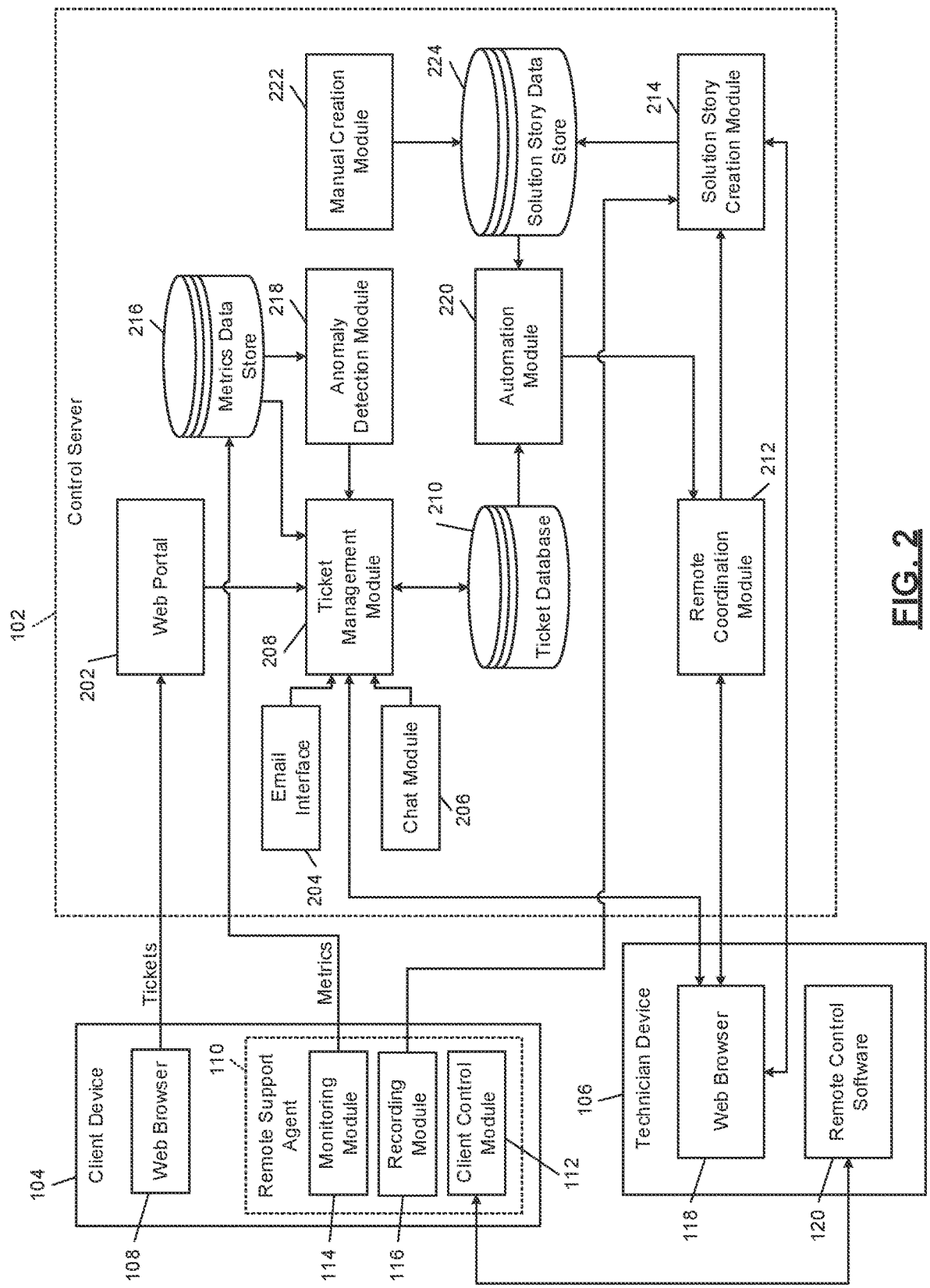
FIG. 2 is a functional block diagram of an example implementation of a control server.

FIG. 2 is a functional block diagram of an example implementation of the control server 102. The control server 102 includes a web portal 202, an email interface 204, a chat module 206, a ticket management module 208, a ticket database 210, a remote coordination module 212, a solution story creation module 214, a metrics data store 216, an anomaly detection module 218, an automation module 220, a manual creation module 222, and a solution story data store 224.

The user may log into the web portal 202 and open a service ticket using the web browser 108. The ticket management module 208 generates the service ticket based on the supplied fields and may also auto-populate certain fields.

In various implementations, a user may contact a helpdesk or a technician directly, for example, using an email, a chat, or a phone call. The email interface 204 may identify relevant information from a user email and populate fields of a service ticket based on the relevant information.

The chat module 206 may identify relevant information provided in a chat conversation exchanged between the user and a technician or help desk staffer. The ticket management module 208 generates a service ticket based on the relevant information. The chat conversation exchanged between the user and the technician may be attached to the service ticket. The service ticket may be generated after the chat conversation has ended. In various implementations, the service ticket may be generated during the chat conversation. In various other implementations, the ticket may be generated from relevant information exchanged during a phone call between the user and the technician.

The ticket management module 208 generates and manages service tickets received from various sources including the web portal 202, the email interface 204, and the chat module 206. The technician may log into the ticket management module 208 from the web browser 118 to view the service ticket including a status (for example, waiting to be assigned, open, in progress, closed, etc.) of the service ticket. The ticket management module 208 may assign service tickets that are marked as "waiting to be assigned" to the available technicians. The ticket management module 208 may assign the service ticket to the technician who requested the service ticket or assign the service ticket to the technician with the most relevant knowledge of the characteristics of the service ticket. For example, if the service ticket indicates a network connectivity incident, a technician with the most knowledge about networks may be assigned to resolve the service ticket. Once the ticket has been assigned to the technician, the ticket management module 208 may update the status of the service ticket from "waiting to be assigned" to "open," and the ticket management module 208 may transmit a notification to the technician that notifies the technician that the service ticket has been assigned to the technician.

In response to a notification, the technician may select the corresponding service ticket from the ticket management module 208. The technician may populate parts of the technician fields of the service ticket. Additionally, the ticket management module 208 allows the technician to view a list of all open service tickets assigned to the technician under the "open" status.

When the technician is ready to resolve the service ticket, the technician may remotely connect to the client device 104. The web browser 118 may send the remote control initialization request to the client control module 112 via the remote coordination module 212. Once consent is granted by the user of the client device 104, the remote control software 120 may conduct the remote control session directly with the client control module 112. The ticket management module 208 may update the status of the service ticket from "open" to "in progress" in response to the remote control session.

The recording module 116 is configured to record the remote control session. The ticket management module 208 may update the status of the service ticket from "in progress" to "closed" in response to termination of the remote control session by the technician. When the remote control session is terminated, the recording may be compressed and transmitted to the solution story creation module 214. The recording may be viewed and modified by the technician before being stored in the solution story data store 224 as a solution story. The solution story may be a recording that describes the set of actions performed by the technician during the remote control session. The solution story may be presented to other technicians to demonstrate to other technicians how to resolve the service ticket, may be shown to the user to demonstrate the set of actions performed by the technician, and may be used to automatically perform the set of actions from the solution story on a second client device in response to receiving a second service ticket submitted on behalf of the second client device.

The manual creation module 222 manually creates each action of the set of actions. For example, a technician may create a text document, constructed as a JavaScript Object Notation (JSON) document, that includes one or more UI interactions. The manually created action may also include a screenshot that is manually recorded by the technician using a screenshot manipulation application (such as the Windows Snipping Tool). Additionally or alternatively, the manual creation module 222 may manually create each action of the set of actions by converting a knowledge base (KB) article to the set of actions. The manually created solution story is stored in the solution story data store 224.

The metrics data store 216 receives metrics of the client device 104 from the monitoring module 114. The anomaly detection module 218 processes the metrics stored in the metrics data store 216 and detects anomalies in the metrics, such as deviation outside of a historical operating envelope. Once an anomaly is detected, the anomaly detection module 218 may identify relevant information from the metrics and generate a service ticket based on the relevant information. The ticket management module 208 generates the service ticket based on the required fields and the auto-populated fields.

The automation module 220 attempts to automatically resolve a new service ticket based on a stored solution story. If a relevant solution story is available, the remote coordination module 212 may establish a connection between the automation module 220 and the client control module 112. Once the connection is established, the automation module 220 may communicate directly with the client control module 112 to replay the UI interactions stored as part of the solution story. The automation module 220 may be fully automated so that certain service tickets may be resolved automatically without any intervention from a technician. In various implementations, the automation module 220 may be partially automated so that certain service tickets may be resolved with the help of the technician. For example, the technician may select which actions of the solution story to perform and the automation module 220 may perform the selected actions to resolve the service ticket.

Solution Story Creation

Figure 3:
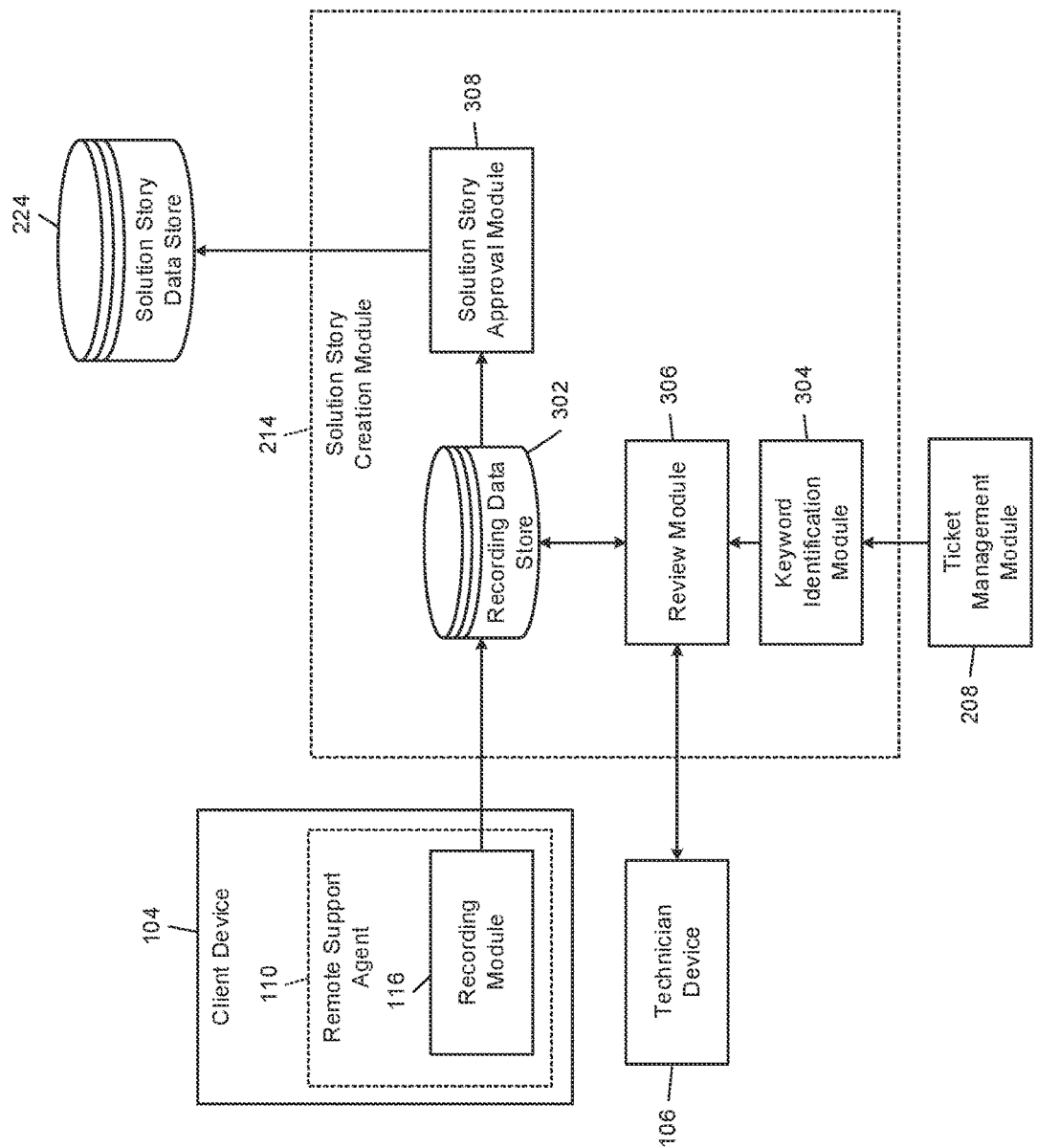
FIG. 3 is a functional block diagram of an example implementation of a solution story creation module.

FIG. 3 is a functional block diagram of an example implementation of the solution story creation module 214. The solution story creation module 214 includes a recording data store 302, a keyword identification module 304, a review module 306, and a solution story approval module 308. The solution story creation module 214 may generate a solution story based on a recording received from the recording module 116. The recording is stored in the recording data store 302. The solution story may include a recording that describes the set of actions performed by the technician during the remote control session. The solution story may be stored as a set of basic resolution step (BRS) data structures stored within a resolution profile (RP) data structure. Each action of the set of actions is stored as a BRS that conforms to a BRS data structure definition as described in FIG. 4. The RP is a data structure that, for each action, stores or includes a pointer to a BRS.

The keyword identification module 304 identifies a set of keywords based on characteristics of the service ticket. The keyword identification module 304 may identify the set of keywords from text, such as the title and/or the description, associated with the service ticket. The keyword identification module 304 may identify the set of keywords using, for example, natural language processing (NLP). If NLP is unable to identify any keywords, the set of keywords may initially be the empty set. The characteristics of the service ticket may include an operating system type of the client device 104, an application name, and/or a category of hardware (e.g., network hardware, printer hardware, input device hardware, etc.). The keyword identification module 304 associates the set of keywords with the recording, which quickly categorizes the recording.

The review module 306 allows the technician to review and edit the set of actions that the technician performed during the remote control session. Each action of the set of actions may correspond to a BRS. The technician may edit the set of BRSs. For example, the technician may remove a screenshot and/or an action that is irrelevant or redundant, add annotations (such as arrows, highlighting, text, etc.) to the screenshot, or add a description (such as additional instructions, comments, etc.) to the action. The review module 306 also allows the technician to edit the set of keywords (such as by adding or removing) that are associated with the recording. Once the reviewing and editing is completed, the modified set of BRSs and the set of keywords may be saved as a RP—also referred to as a solution story.

The solution story approval module 308 determines that the solution story conforms to best practices. For example, an IT manger may review the solution story to determine that the solution story is the most efficient way to resolve the service ticket with the least side effects (such as deleting and re-creating a user's Windows profile. Efficiency may be defined by least amount of actions, least amount of resources used, etc. An approved solution story is saved in the solution story data store 224.

Data Structure

Figure 4:
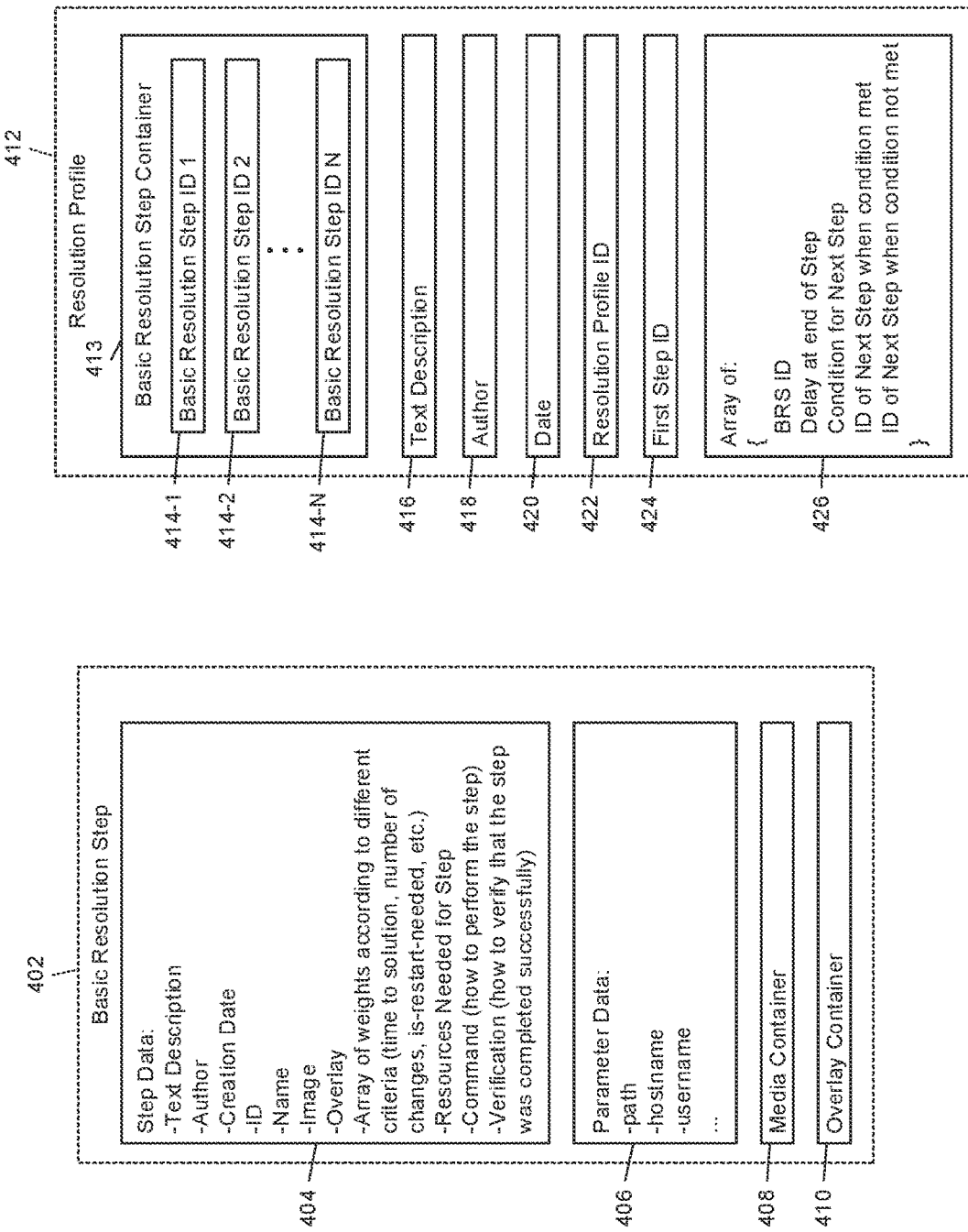
FIG. 4 is a graphical illustration of example data structure definitions according to the principles of the present disclosure.

FIG. 4 is a graphical illustration of example data structure definitions including a BRS 402 and an RP 412. The BRS 402 includes step data 404 that provides a description and instructions of the BRS 402. The step data 404 includes a text description, an author, a creation date, a BRS identification (ID), and a name. The text description is a description of the BRS 402 that may be generated automatically, which the technician may be able to modify. The author may be the technician who created the BRS 402 or the tool used to generate the BRS 402. The creation date is a date that the BRS was generated. The BRS ID is an identifier that uniquely identifies the BRS 402 and may include numeric or alphanumeric values. The name of the BRS 402 may be derived from the text description.

The step data 404 also includes an image field, overlay, array of weights, resources needed for the BRS 402, a command, and a verification. The image field may specify a uniform resource locator (URL) where a relevant screenshot is stored. The array of weights includes a numeric weight for each of a set of predetermined criteria, such as time to solution, number of changes, is-restart-needed, etc. The resources needed for the BRS 402 may describe hardware or software components needed to perform the BRS 402 on a client device. The command may outline how to perform an action on a client device and the verification may outline how to verify that the command was performed successfully.

The BRS 402 also includes parameter data 406, a media container 408, and an overlay container 410. The parameter data 406 is a predefined set of parameters that are populated in order to perform the BRS 402 based on the type of user. For example, the parameter data 406 may include a path, a hostname, and a username. The media container 408 may include one or more screenshots of the client device. In various implementations, the media container 408 may be located in cloud storage. The overlay container 410 includes annotations (e.g., arrows, highlights, shapes, text, etc.) that are put on top of the screenshots.

The BRS 402 may be a directory (e.g., such as a compressed folder) in a file system. The step data 404 and the parameter data 406 may be a JSON file or document, a hypertext markup language (HTML) file or document, or an extensible markup language (XML) file or document (stored in that directory).

The RP 412 includes a set of BRSs stored in a BRS container 413, such as a file system folder. The BRS container 413 includes a set of BRSs 414-1, 414-2, . . . , and 414-N (collectively, BRSs 414), where N is an integer greater than or equal to one. Each of the BRSs is characterized by a BRS ID. The BRS ID may correspond to the sequential order that the BRS is listed in the BRS container 413. For example, the BRS 414-1 may have a BRS ID that is one lower than the BRS ID of the BRS 414-2, and the ID of BRS-(n−1) may be one lower than the ID of BRS 414-N. In various implementations, the BRS ID is stored in the respective BRS as part of the step data 404.

The RP 412 also includes a text description 416, an author 418, a creation date 420, and an RP ID 422. The text description 416 is a description of the RP 412 that may be generated automatically, and which the technician may be able to modify. The author 418 may be the author of the RP 412 or the tool used to generate the RP 412. The creation date 420 is a date that the RP was generated. The RP ID 422 is a unique identifier that identifies the RP 412 and may include numeric or alphanumeric values.

The RP 412 also includes a first step ID 424 and a resolution step list 426. The first step ID 424 identifies which of the BRSs 414 in the BRS container 413 to begin with. For example, the first step ID 424 may identify BRS 414-2. In various implementations, the resolution step list 426 is an array that describes the order of performance of the BRSs 414.

Each entry in the resolution step list 426 includes a condition for proceeding to the next step, the BRS ID for the current step, a delay at end of the current step, ID of next step when the condition is met, and ID of the next step when condition not met. The condition for next step determines which step will be performed next. As a specific example, an RP includes 10 BRSs corresponding to 10 steps, where step 6 creates a specific folder on the client device. As a simplistic illustration, the IDs for the BRSs 414 may simply be the integers from offset+1 to offset+N, respectively, where offset is the last-used ID for BRSs recorded previously to the RP 412.

The first four entries in the resolution step list 426 may simply specify BRSs 414-1 through 414-4, respectively, have no associated conditions, and simply specify the subsequent ID as the next step. In other words, the first entry specifies BRS 414-1 as the current step and BRS 414-2 as the next step. In various implementations, the condition may be set to a null value to avoid testing of the condition. Meanwhile, in this example, the fifth entry in the resolution step list 426 specifies BRS 414-5 as the current step, BRS 414-7 as the next step if the condition is met, and BRS 414-6 as the next step if the condition is not met. The condition tests for the existence of a specific folder in the client device's file system. BRS 414-7 encodes a command that creates the specific folder, and is therefore skipped if the specific folder already exists.

The RP 412 may be a collection, such as a compressed file (using, for example, zip, rar, or 7z compression schemes), in the file system. The text description 416, the author 418, the creation date 420, the RP ID 422, the first step ID 424, and the resolution step list 426 may collectively be a JSON file or document, an HTML file or document, or an XML file or document.

Automated Fix

Figure 5:
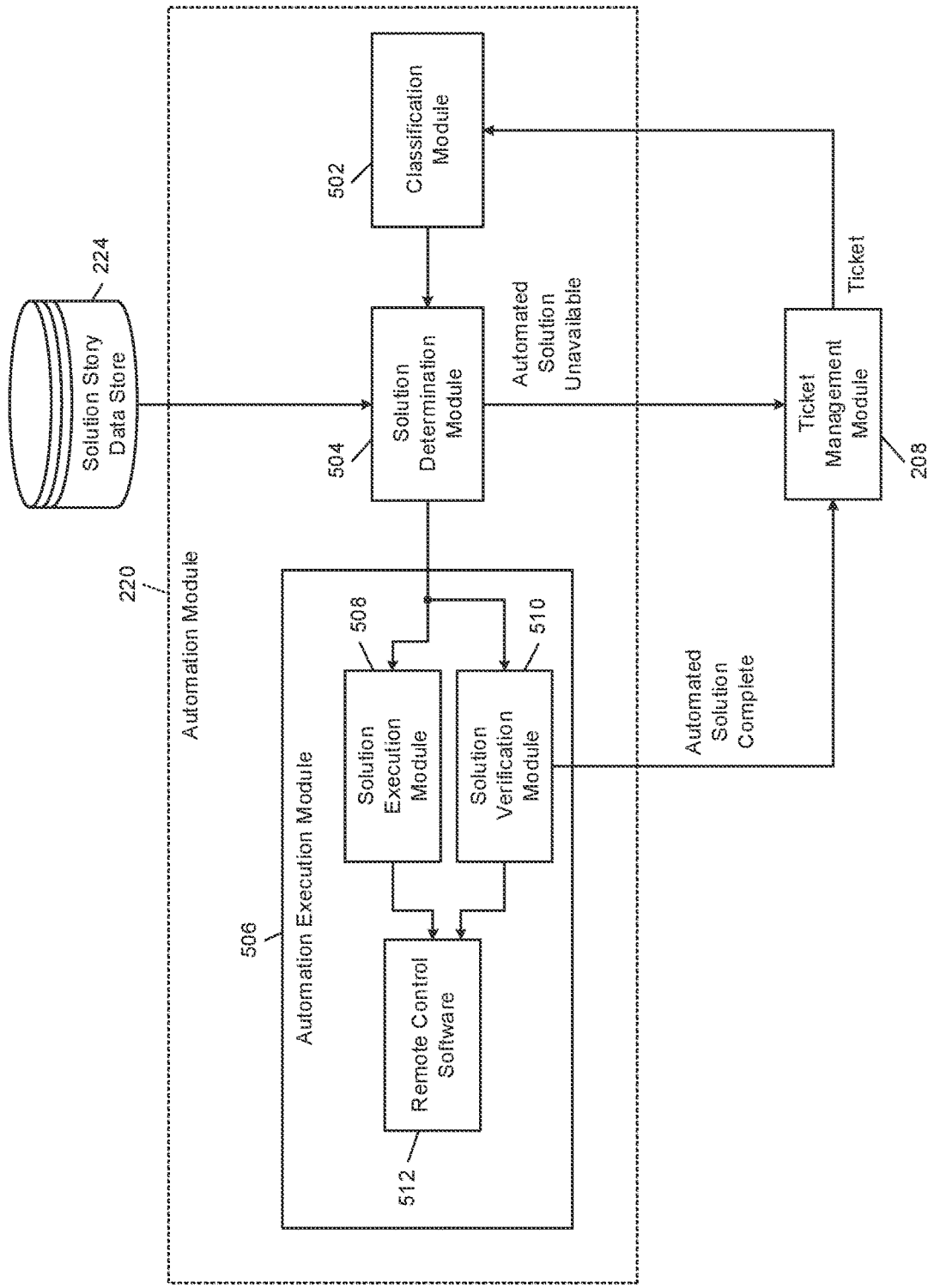
FIG. 5 is a functional block diagram of an example implementation of an automation module.

FIG. 5 is a functional block diagram of an example implementation of the automation module 220. The automation module 220 performs a set of actions from the solution story to resolve a service ticket. The automation module 220 includes a classification module 502, a solution determination module 504, and an automation execution module 506.

The classification module 502 classifies a service ticket from the ticket management module 208. The classification module 502 may classify the service ticket using, for example, NLP and/or machine learning. The classification module 502 may classify the service ticket by processing the title and description of the symptoms identified in the service ticket. Certain symptoms may be associated with various incidents or requests. The classification module 502 may obtain additional test results to classify the incident.

For example, if a service ticket identifies that a file cannot be saved to a remote disk, one or more conditions may have resulted in this undesired state—as examples, a lack of connection to the remote disk, insufficient permissions to write to the remote disk, or space (either physical space of remaining quota allocation) being unavailable on the remote disk. The classification module 502 may request tests including connectivity tests to the remote disk, user permission inquiries, and queries for free space available on the remote disk. Based on the results from the additional information, the classification module 502 may classify the service ticket. In various implementations, if the classification module 502 is unable to classify the service ticket, a technician may be asked to classify the service ticket.

The solution determination module 504 determines if a solution story or RP is available based on the classification of the service ticket. If a relevant solution story is available, the solution determination module 504 may retrieve the solution story from the solution story data store 224. If no solution story is available, the ticket management module 208 may update the status of the service ticket to "solution story unavailable." The ticket may then be handled manually by a technician.

The automation execution module 506 includes a solution execution module 508, a solution verification module 510, and remote control software 512, which may be similar to the remote control software 120. The remote control software 512 establishes a connection between the client device associated with the service ticket and the automation execution module 506.

After the connection is established, the solution execution module 508 executes the set of actions from the loaded solution story on the client device. The solution execution module 508 may replay the set of actions (each of which includes one or more UI interactions) from the solution story to transition the client device from the undesired system state to the desired system state. The solution verification module 510 may verify that the solution story resolved the service ticket by transitioning the client device from the undesired system state to the desired system state. In response to successfully verifying that the set of actions resolved the service ticket, the ticket management module 208 may update the status of the service ticket to "closed" and the remote control software 512 may terminate the connection.

Control

Figure 6:
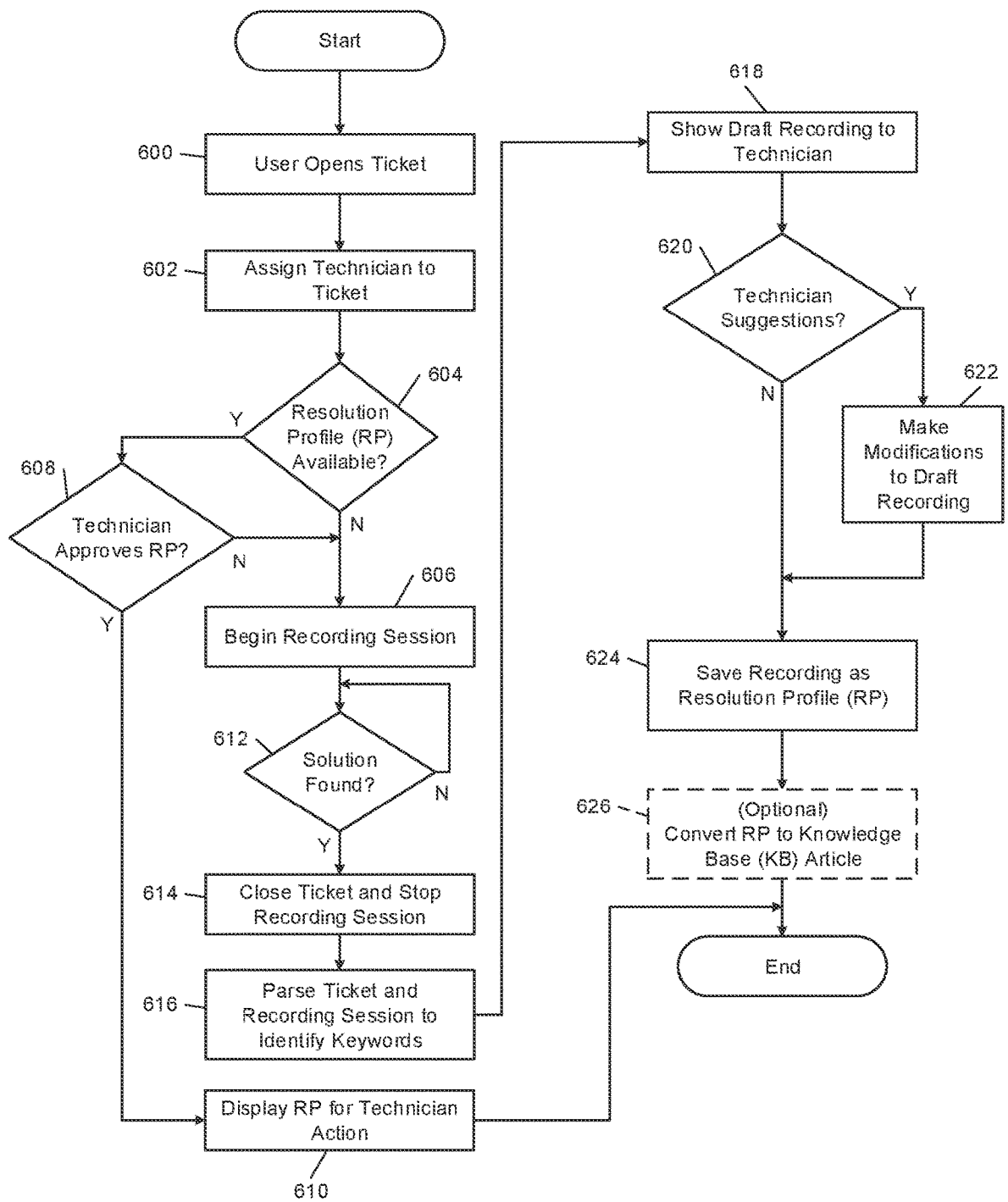
FIG. 6 is a flowchart of example resolution profile (RP) recording.

FIG. 6 is a flowchart of example RP recording and usage. Control begins at 600, where a user of a client device opens a service ticket. At 602, control assigns the service ticket to a technician. The technician may request that the service ticket be assigned to the technician. At 604, control determines whether an RP relevant to the ticket is already available. If so, control transfers to 608; otherwise, control continues to 606. At 608, control determines whether the technician approves of the available RP. If so, control continues to 610; otherwise, control transfers to 606. At 610, control displays the RP for the technician to take action. This may involve showing the technician a series of screenshots that the technician can step through. Control then ends.

At 606, control begins recording of a remote control session of the client device. At 612, control determines whether a solution to the service ticket is found. If so, control continues at 614; otherwise, control returns to 612. At 614, control closes the service ticket and stops the recording of the remote control session and continues at 616. At 616, control parses the service ticket and the recording of the remote control session to identify a set of keywords. At 618, control shows the keywords and a draft of the recording to the technician.

At 620, control determines if the technician has any modifications to make to the draft recording. If so, control transfers to 622; otherwise, control continues to 624. At 622, control makes the technician's modifications to the draft recording and continues at 624. At 624, control saves the recording as an RP. Control may end after 624. In various implementations, control may continue to 626, where control converts the RP to a KB article, and then ends.

The KB article may serialize the RP into a human-readable document (e.g., web document, portable document format (PDF) document, etc.) with a set of screenshots. The KB article may identify text that is proximate to a coordinate location of where a mouse event occurred in the RP. The KB article may associate the identified text with a screenshot. The resulting KB article may include text, screenshot, text, screenshot, text, etc.

Figure 7:
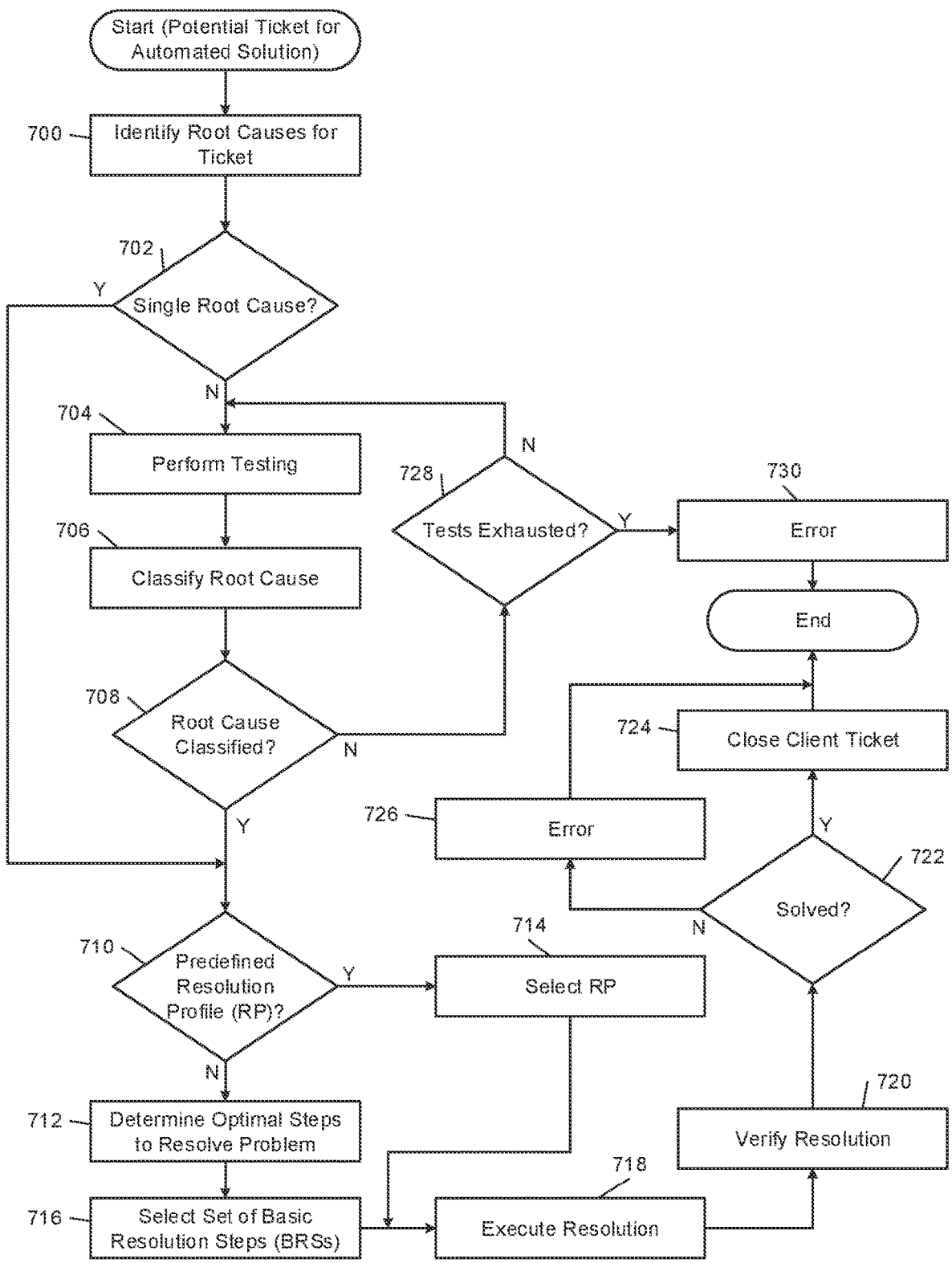
FIG. 7 is a flowchart of example automatic resolution of a hypothetical service ticket.

FIG. 7 is a flowchart of example automatic fixing of a service ticket. Control begins at 700, after a service ticket—for which there may be a relevant solution story—has been received. At 700, control identifies root causes for an incident or request identified in the service ticket. For example, an inability to open a file could be caused by a lack of an appropriate installed application, connectivity problems, access restrictions, etc. In another example, a request for use of a specified printer may be described as an undesired system state: the inability to print. The root causes of this state may be lack of a printer driver, the printer not having been identified to the client's operating system, a network connectivity issue, the absence of the client's computer from a certain domain, lack of access rights to a corresponding print spooler, etc.

At 702, control determines whether there is a single root cause for the undesired system state implicated by the service ticket. If so, control transfers to 710; otherwise, control continues to 704. At 704, control performs additional testing to determine the root cause for the service ticket. At 706, control attempts to classify the root cause for the service ticket based on the testing. At 708, control determines whether the root cause (or causes) can be classified. If so, control continues to 710; otherwise, control transfers to 728. At 728, control determines whether all the additional tests have been exhausted. If so, control performs error handling at 730 and then ends; otherwise, control returns to 704.

At 710, control determines whether a predefined RP exists to address the classified cause(s) of the incident. If so, control continues to 714, where control selects the predefined RP; otherwise, control continues to 712. At 712, control determines optimal steps (for example, BRSs) to resolve the service ticket. As a simplistic example, the current state of the system may be called State A while the desired state of the system may be called State D. Optimal steps may include:

a first BRS that transitions the system from State A to State B a second BRS that transitions the system from State B to State D, a third BRS that transitions the system from State A to State C, and a fourth BRS that transitions the system from State C to State D.

For example, these BRSs may be determined using deep learning analysis, such as convolutional neural networks, deep neural networks, deep belief networks, etc.

At 716, control selects a set of BRSs from the determined optimal steps. For example, this selection may be performed using deep learning analysis, such as convolutional neural networks, deep neural networks, deep belief networks, etc. In various implementations, a shortest path algorithm may be to select predefined BRSs to resolve the service ticket. Continuing the above example, there are two possible combinations—using the first and second BRSs or using the third and fourth BRSs. The shortest path algorithm determines which of the two possible combinations to use. The shortest path algorithm may evaluate the path length based one or more criteria, such as the some or all of the array of weights described above for each BRS. These weights may include, for example, time to solution, number of changes, is-restart-needed, etc.

At 718, control executes the selected resolution (that is, a predefined RP or the selected set of BRSs). At 720, control verifies whether the selected resolution was effective. At 722, control determines whether the selected resolution solved the service ticket. If so, control closes the service ticket at 724 and then ends; otherwise, control performs error handling at 726 and then ends.

Application User Interface

Figure 8A:
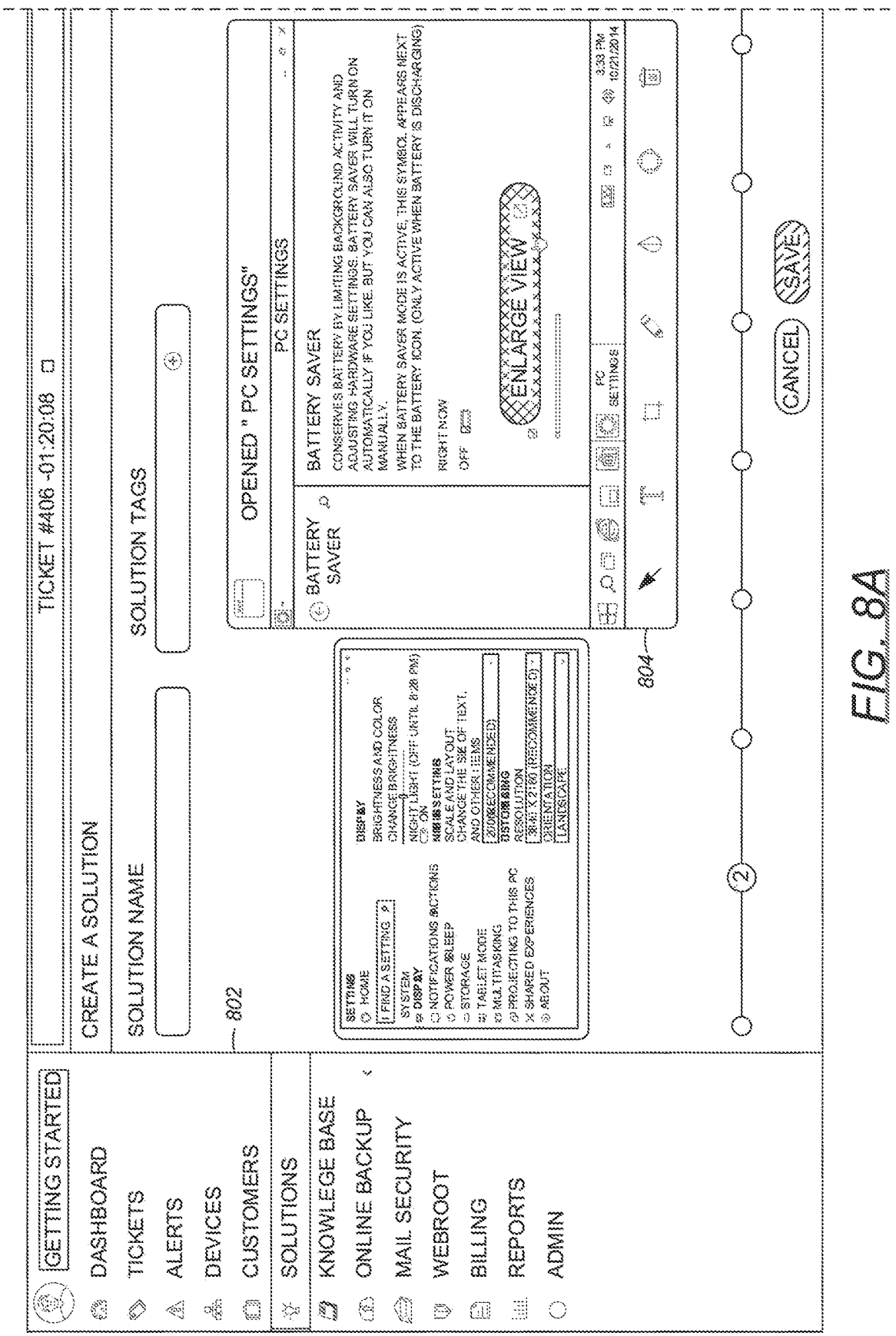
FIGS. 8A and 8B together are an example solution story creation screen of a solution story application.
Figure 8B:
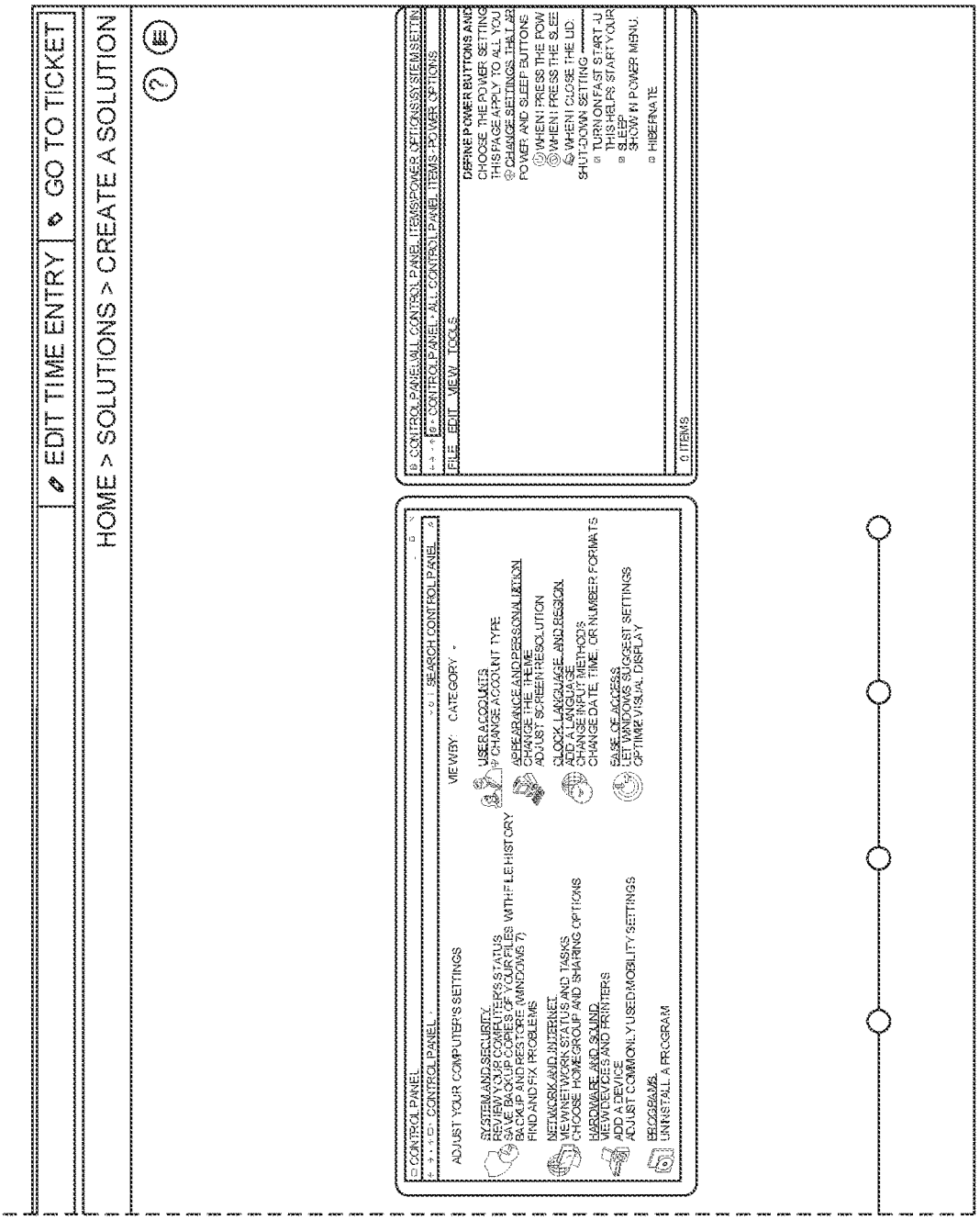

FIGS. 8A and 8B together form an example solution story creation screen of a solution story application, which may be a web application or native application. The solution story application may include a navigation pane 802 that allows the technician to navigate within the solution story application. For example, the navigation pane 802 in FIGS. 8A and 8B (referred to collectively as FIG. 8) includes a dashboard tab, a tickets tab, an alerts tab, a devices tab, a customers tab, a solutions tab, a knowledge base tab, an online backup tab, a mail security tab, a webroot tab, a billing tab, a reports tab, and an admin tab. The tickets tab provides a list of the service tickets and allows the technician to view a particular service ticket. The solutions tab may be used to view existing solution stories or to create a new solution story as shown in the example of FIG. 8.

For a selected solution story (which may have just been created), an annotation toolbar 804 is used to annotate a screenshot. The annotation toolbar 804 may include tools, such as a pointer, a text cursor, cropping tool, a highlighter, shape selector, etc., which adds an overlay to the screenshot.

Figure 9:
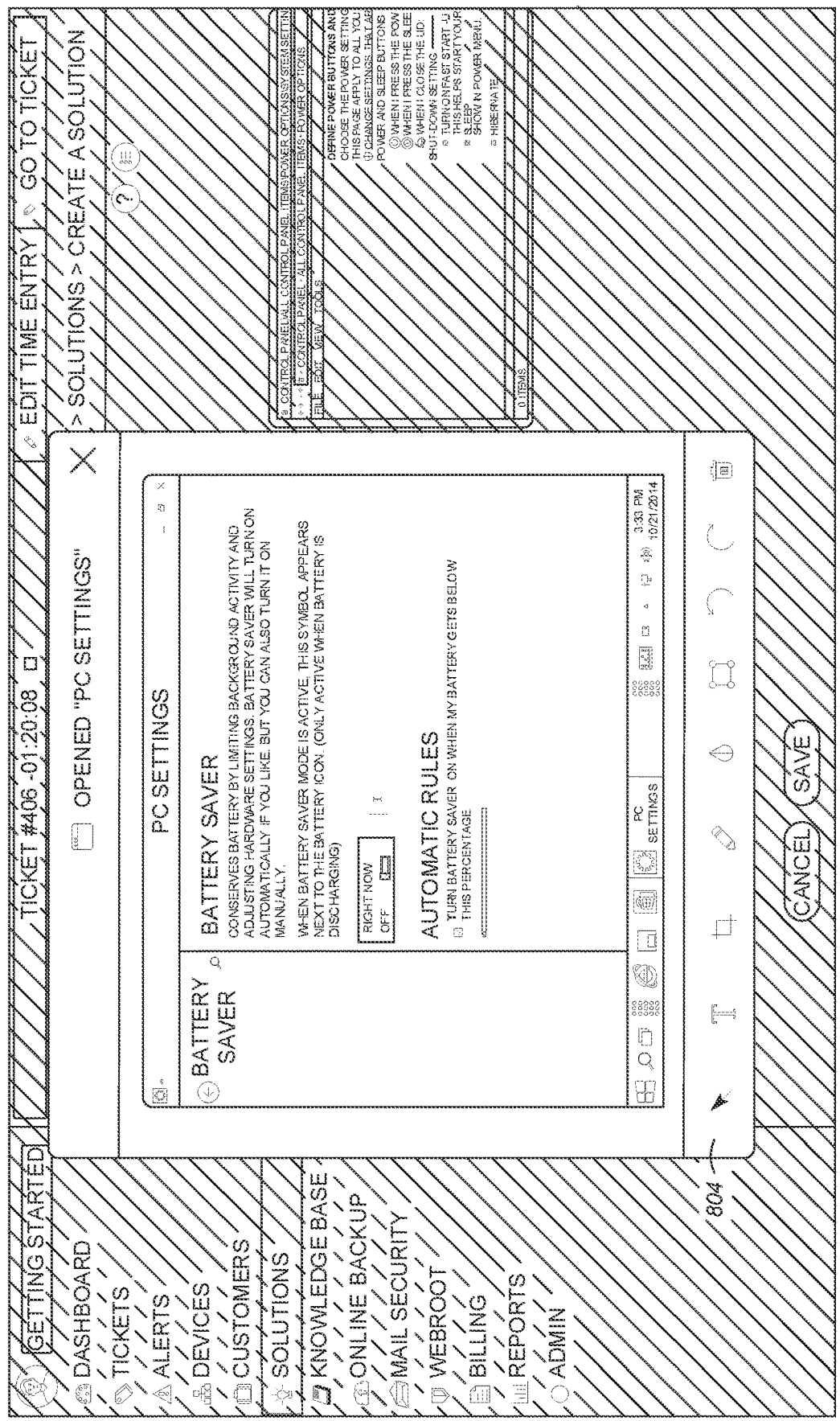
FIG. 9 is an example annotated solution story creation screen of the solution story application.

FIG. 9 is an example annotated solution story creation screen of the solution story application. The technician has annotated the screenshot with a rectangular-shaped highlight to emphasize a battery saver setting. The rectangular shape was selected from the shape selector tool in the annotation toolbar 804. The technician is poised to enter text to the right of the rectangular shape as shown by the vertical line and the text insertion cursor.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A method comprising:
receiving a service ticket corresponding to an undesired system state of a client device;
assigning the service ticket to a technician;
coordinating a remote control session between a technician device and the client device, wherein the technician device is under control of the technician;
obtaining a set of actions performed under remote control by the technician to transition the client device from the undesired system state to a desired system state, wherein each action of the set of actions describes one or more user interface (UI) interactions with the client device;
identifying textual descriptors for the service ticket based on characteristics of the service ticket;
storing a resolution profile (RP) based on the set of actions and the textual descriptors; and
in response to receiving a second service ticket submitted on behalf of a second client device:
classifying the second service ticket; and
in response to the classification indicating that the RP is applicable to the second service ticket:
selectively instructing a software agent executing on the second client device to programmatically replay the set of actions from the RP on the second client device without technician intervention; and
verifying that the programmatic replay of the set of actions transitioned the second client device to a desired system state associated with the RP.

2. The method of claim 1 further comprising:
presenting the set of actions to the technician; and
selectively modifying the set of actions in response to receiving input from the technician,
wherein the RP is stored based on the set of actions as modified.

3. The method of claim 1 wherein the classifying the second service ticket is performed using natural language processing of text of the second service ticket.

4. The method of claim 3 wherein the natural language processing is performed on title text and description text of the second service ticket.

5. The method of claim 1 wherein the classifying the second service ticket includes selectively requesting a test to be performed by the second client device.

6. The method of claim 1 further comprising, in response to receiving the second service ticket, selectively requesting a test to be performed by the second client device.

7. The method of claim 6 wherein the test includes at least one of a connectivity test, a user permission inquiry, and an available space query.

8. The method of claim 1 further comprising, in response to the classification indicating that a second solution is applicable to the second service ticket, presenting the second solution to a user of the second client device.

9. The method of claim 1 wherein the classifying is selectively based on, in addition to the second service ticket, metrics obtained from a monitoring module executing on the second client device.

10. The method of claim 1 further comprising:
monitoring metrics obtained from a monitoring module executing on the second client device; and
programmatically generating the second service ticket in response to an anomaly in the metrics.

11. The method of claim 1 further comprising, after the storing, selectively converting the RP to a knowledge base (KB) article to share with other technicians, wherein the KB article includes a serialized RP.

12. The method of claim 1 wherein:
each action of the set of actions is stored in a basic resolution step (BRS) data structure that conforms to a BRS data structure definition, and
the RP encodes an order of execution of the BRS data structures.

13. The method of claim 1 wherein a first basic resolution step (BRS) data structure corresponding to a first action of the set of actions includes a screenshot of the client device captured before the first action is performed.

14. The method of claim 13 wherein the first BRS data structure stores a command where execution transitions the client device from the undesired system state to a second system state.

15. The method of claim 1 wherein a first action of the set of actions includes at least one of a mouse event and a keypress event on a keyboard.

16. The method of claim 1 further comprising, in response to the second client device being in the undesired system state, replaying the RP at the second client device.

17. The method of claim 1 further comprising generating the service ticket from at least one of a web browser, an email interface, a chat interface, and a phone call.

18. The method of claim 1 further comprising:
presenting the set of actions to the technician; and
selectively modifying the set of actions in response to receiving input from the technician, wherein the RP is stored based on the set of actions as modified.

19. A non-transitory computer-readable medium storing instructions executable on processor hardware comprising:
receiving a service ticket corresponding to an undesired system state of a client device;
assigning the service ticket to a technician;
coordinating a remote control session between a technician device and the client device, wherein the technician device is under control of the technician;
obtaining a set of actions performed under remote control by the technician to transition the client device from the undesired system state to a desired system state, wherein each action of the set of actions describes one or more user interface (UI) interactions with the client device;
identifying textual descriptors for the service ticket based on characteristics of the service ticket;
storing a resolution profile (RP) based on the set of actions and the textual descriptors; and
in response to receiving a second service ticket submitted on behalf of a second client device:
classifying the second service ticket; and
in response to the classification indicating that the RP is applicable to the second service ticket:
selectively instructing a software agent executing on the second client device to programmatically replay the set of actions from the RP on the second client device without technician intervention; and
verifying that the programmatic replay of the set of actions transitioned the second client device to a desired system state associated with the RP.

20. A system comprising:
processor hardware; and
memory hardware configured to store instructions for execution by the processor hardware, wherein the instructions include:
receiving a service ticket corresponding to an undesired system state of a client device;
assigning the service ticket to a technician;
coordinating a remote control session between a technician device and the client device, wherein the technician device is under control of the technician;
obtaining a set of actions performed under remote control by the technician to transition the client device from the undesired system state to a desired system state, wherein each action of the set of actions describes one or more user interface (UI) interactions with the client device;
identifying textual descriptors for the service ticket based on characteristics of the service ticket;
storing a resolution profile (RP) based on the set of actions and the textual descriptors; and
in response to receiving a second service ticket submitted on behalf of a second client device:
classifying the second service ticket; and
in response to the classification indicating that the RP is applicable to the second service ticket:
selectively instructing a software agent executing on the second client device to programmatically replay the set of actions from the RP on the second client device without technician intervention; and
verifying that the programmatic replay of the set of actions transitioned the second client device to a desired system state associated with the RP.

* * * * *